Oct. 11, 1960

S. A. YOUNG 2,955,295

VALVE AND MOUNTING MEANS THEREFOR

Filed Jan. 13, 1958

INVENTOR.
S. A. Young
BY
Robb + Robb
attorneys

Oct. 11, 1960 S. A. YOUNG 2,955,295
VALVE AND MOUNTING MEANS THEREFOR
Filed Jan. 13, 1958 2 Sheets-Sheet 2

INVENTOR.
S. A. Young
BY
Robb & Robb
attorneys

United States Patent Office

2,955,295
Patented Oct. 11, 1960

2,955,295

VALVE AND MOUNTING MEANS THEREFOR

Stephen A. Young, Delphi, Ind.

Filed Jan. 13, 1958, Ser. No. 708,649

4 Claims. (Cl. 4—192)

This invention relates to plumbing fixtures and more particularly to means for mounting valves or the like in wall structures, such as is necessary with so-called built-in fixtures.

Usually, installation of built-in valves is effected by the plumber by construction of backing between studs forming the wall, necessarily involving some carpentry as well as plumbing knowledge. Further once such backing is put in place, the valve must be fastened thereto in some manner. This is usually effected by clamping devices of one kind or another or by using plumbers tape and suitable screws or nails in conjunction therewith.

One of the problems usually involved in installation as previously outlined, is that valve bodies are most often castings whose contours are designed without regard for the necessity of fastening them securely to the wall structure, nor have provisions been made for doing so irrespective of the contours mentioned.

As a matter of fact under many circumstances, positioning of valves is largely dependent on the ingenuity of the plumber, having in mind that few installations are duplicates of those previously made.

With the foregoing outline of a few of the most important problems in mind, a summary of the salient objects and advantages of this invention will suggest the very substantial improvement in the art provided hereby.

First of all, one of the objects hereof is to provide a valve which is designed as to external contours so as to be mounted easily, even by present known practice, this being accomplished by flattening the body at the valve section thereof.

A further important object hereof, is to provide as an integral part of the body itself, means which will facilitate positioning the same by present practice without resorting to separate loose pieces not actually part of the valve itself.

Yet another object hereof is to avail of the added means for positioning by providing attachments thereto, which are adjustable to a wide range in such a manner as will not only accommodate widely spaced studs but also very closely spaced studs; in certain instances, a single stud will even be sufficient for attachment thereto.

A still further object of this invention is to provide mounting members attached to the valve body for example, whereby to be adjustable for longitudinal positioning thereof and in addition and combination with such adjustment, enable transverse or lateral positioning as well, such as might be required by walls in which studs of different widths or depths may be used.

Further to the just described objects, the mounting members mentioned are not only adjustable throughout a 360 degree range preferably, but are deformable so as to enable placement of the body at different depths, so to speak, in the wall.

Other and further objects of the invention will be understood from a consideration of the specification appended hereto and shown in the drawing wherein.

Figure 1:
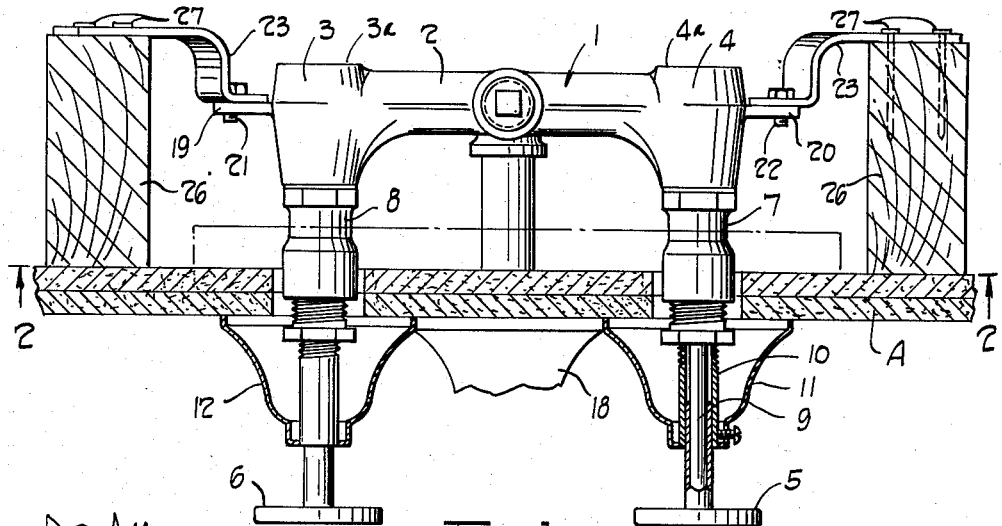
Figure 1 is a top plan view, partially in section in certain aspects, showing a valve constructed in accordance with this invention as being mounted in a wall availing of the mounting means provided hereby.
Figure 2:
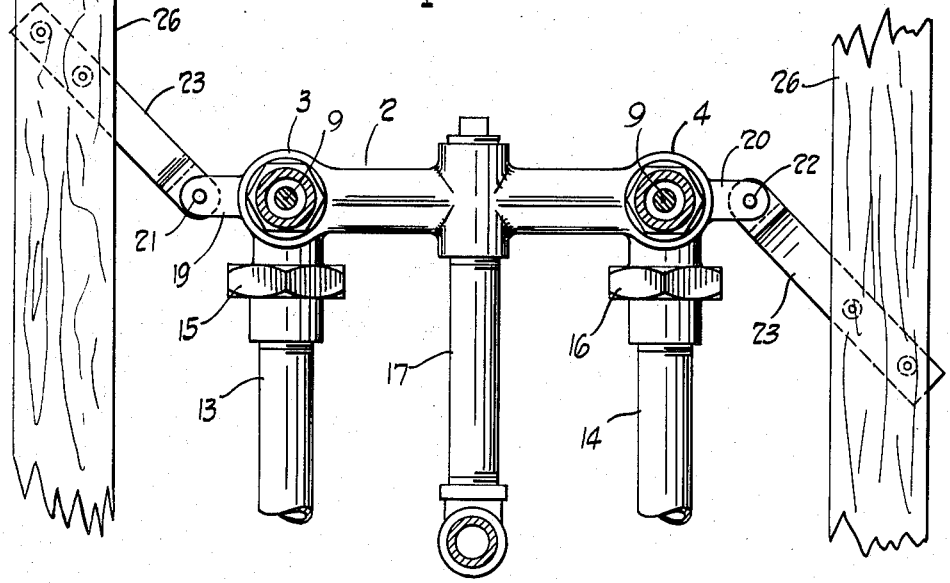
Figure 2 is a sectional view about on the line 2—2 of Figure 1 looking in the direction of the arrows and more particularly disclosing certain aspects of the adjustability provided hereby.

Referring now to the drawings, particularly initially to Figures 1 and 2, it will be seen that a so-called two-valve tub fixture generally denoted 1 is mounted behind a wall denoted A of the usual plaster and lath construction, said fixture 1 comprising a body 2 including valve sections 3 and 4 at opposite ends thereof, said body 2 providing for mixture of water admitted to the valve sections and into the said body by means of operation of the handles such as 5 and 6 respectively extending from the bodies and bonnets 7 and 8 respectively.

The handles 5 and 6 are of course mounted on stems such as 9 shown in the left hand portion of Figure 1 which may operate in a sleeve 10, the entire portion thus described being hidden as is usually the case by escutcheons such as 11 and 12. It will be apparent that manipulation of the handles 5 and 6 and valve mechanism inside the portions 3 and 4 will permit the inflow of water through the supply pipes 13 and 14, hot and cold respectively and the union connections 15 and 16 usually provided in to the body 2 and valve sections 3 and 4, where the water is thereupon mixed and in turn directed to the tub through a sub-supply line 17 and out through a spout shown as a fragment at 18 in Figure 1.

The valve portions 3 and 4 are provided with ears or lugs 19 and 20 respectively, which ears or lugs are preferably formed integrally with the body at the time when the same is made and this is usually done by the process known as casting. Such lugs or ears 19 and 20 have suitable openings therein which may preferably be tapped so as to receive machine screws such as 21 and 22 shown in place therein and extending therethrough, which machine screws are arranged to fix with respect to the body by means of the connection to the ears thereof the mounting members 23, which are in this case identical members as will be readily understood there being one provided at each end of the body or along the longitudinal axis thereof so to speak.

It should be pointed out that at each valve portion 3 and 4, the extremity thereof is flattened as at 3a and 4a respectively so that even without the use of the mounting members 23, such flattened portion could be placed against a backing board or the like and suitable nails or screws inserted through the openings in the ears 19 and 20 whereby to fix the valve 1 in a desired position according to conventional practice.

Figure 6:
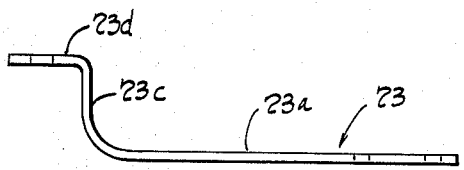
Figure 6 is a side elevational view of one of the mounting members, on somewhat enlarged scale.
Figure 7:
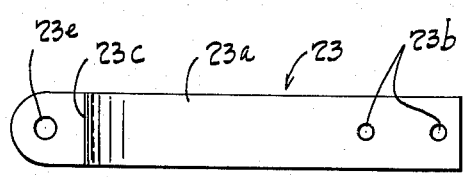
Figure 7 is a plan view showing the mounting member of Figure 6.

In this particular instance and according to the improvements thereof, however the valve 1 is adapted to be mounted in virtually innumerable positions by means of the mounting members 23 described and their connection with the ears 19 and 20, said mounting members as shown in Figure 6 comprising strap-like parts having a body portion 23a in which is provided suitable nail holes such as 23b at one end. Adjacent the other end the same is provided with an off-set section 23c and a further section or mounting end 23d in which is provided an opening 23e to receive the machine screws such as 21 and 22 previously mentioned. As will be apparent from a consideration of Figure 1, the off-set section 23c is arranged of such a depth as will permit complete 360 degree rotation of the mounting member 23 with respect to either ear 19 or 20 since the flattened portions 3a and 4a are so spaced from the corresponding portions of the ears 19 and 20 as to facilitate such movement.

A further consideration of Figure 1 will indicate that the mounting members 23 are of course fastened to the studs indicated at 26, by means of nails such as 27 commonly available.

A consideration of Figure 2 will of course indicate that the angular disposition of the mounting members 23 may be any particular one calculated best to support the valve 1 as a whole in the wall and permit the wall to be finished thereafter.

Figure 3:
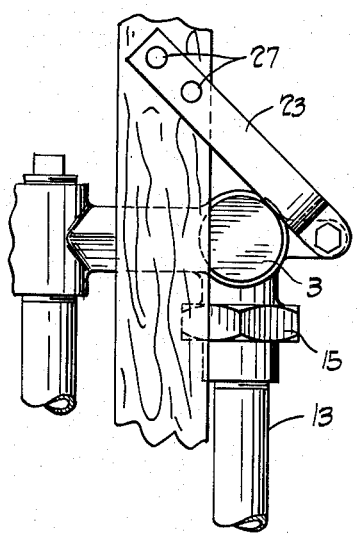
Figure 3 is a fragmentary view in elevation, somewhat similar to that of Figure 2, showing another adjusted position of the valve and mounting means connected therewith, wherein the valve is actually recessed in a stud.

The disclosure of Figure 3 is of course primarily illustrative of the flexible nature of the mounting member 23 and its ability to be connected in virtually any position as is necessary according to the conditions in the particular wall where mounting is to be undertaken and is probably a special condition in most cases but nevertheless one which is encountered.

Figure 5:
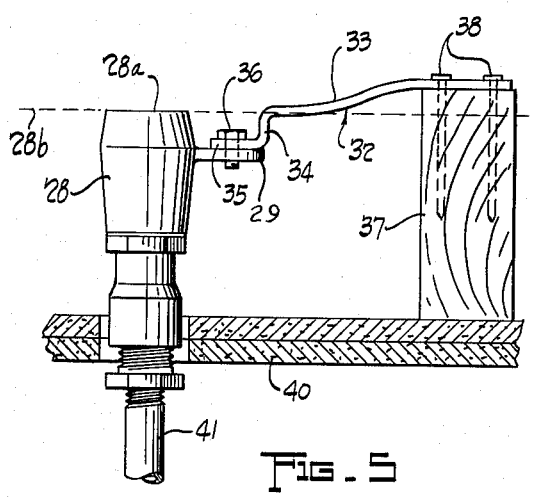
Figure 5 is a top plan view of the disclosure of Figure 4 indicating the deformable properties of the mounting member provided.
Figure 4:
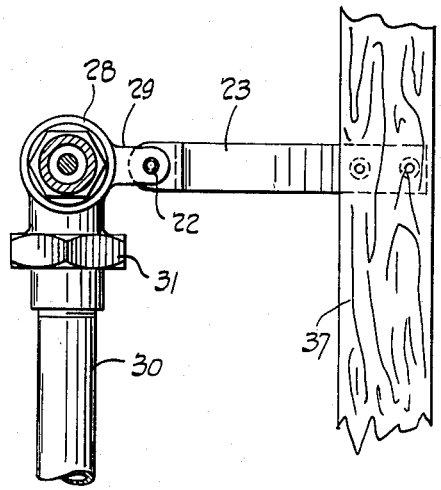
Figure 4 is further view, illustrating a valve wherein only one mounting member is involved and showing the same as supported by a stud in one position.

Turning to a consideration of Figures 4 and 5, a further novel feature of this invention is illustrated, wherein a single valve such as 28 is shown as being provided with an ear 29 thereon, the valve 28 being supplied by the supply line 30 in the usual manner to union connection 31. Of course no handle or escutcheon or wall covering is illustrated in this figure since it is largely similar to the disclosure of Figure 2 but a single valve operating member is provided and a mounting member 23 is connected thereto by means of the machine screw 22. A consideration of Figure 5 will point out a further novel feature of this invention wherein the mounting member in this case is denoted 32 having the offset 33 therein in addition to the offset 34 corresponding to the offset 23c shown in the other figures, the portion 35 corresponding to the portion 23d as will be readily apparent and a suitable machine screw such as 36 being availed of to fasten the valve such as 28, being a single valve in this instance to the mounting member 32. The mounting member 32 is of course fastened to a stud such as 37 by means of the nails or screws as the case may be and denoted 38. The flattened portion of the valve denoted 28a is indicated with reference to a plane at 28b as further means of illustrating the deformable nature of the mounting member 32, which may preferably be formed of suitable strip steel and thus susceptible of being bent into the shape shown in Figure 5 to accommodate a stud of greater depth or width as the case may be as at 37 in contrast to the stud 26 previously described. Of course the outer wall structure such as 40 or wall face is conventional and the stem fragment extending therethrough denoted 41 is provided with a conventional handle for manipulation of the valve portion of the valve 28 and also largely conventional.

From the foregoing it will be apparent how very flexible the mounting provisions are when the mounting members described are availed of and the means of mounting therefor, together with the particular contour formation of the valve body itself.

I claim:

1. In a valve mounting means of the class described, in combination, a valve body, at least one valve section connected therewith, an ear integral with each section intermediate the ends thereof and extending laterally outwardly therefrom, a mounting member having a portion movably connected to each ear adjustably fixable in a predetermined position with respect to each ear, and fastening means to position each mounting member with respect to the respective ear, each mounting member having means for securing to a supporting means.

2. In a valve mounting means as set forth in claim 1, each mounting member having an offset bend therein.

3. In a valve mounting means as set forth in claim 1, each mounting member being made of a deformable material to facilitate variable positioning of the valve body with respect to said supporting means.

4. In a valve mounting means as set forth in claim 1, each mounting member comprising a strap-like, elongated element of deformable material.

References Cited in the file of this patent

UNITED STATES PATENTS

| | | |
|---|---|---|
| 1,115,696 | Linbarger | Nov. 3, 1914 |
| 2,423,757 | Dedge | July 8, 1947 |
| 2,675,978 | Brown | Apr. 20, 1954 |
| 2,773,708 | Beyerle | Dec. 11, 1956 |